(12) United States Patent
Perlo et al.

(10) Patent No.: US 7,495,352 B2
(45) Date of Patent: Feb. 24, 2009

(54) VEHICLE WHEEL

(75) Inventors: Pietro Perlo, Orbassano (IT); Renato Librino, Orbassano (IT); Marco Ottella, Orbassano (IT)

(73) Assignee: CRF Societa a Consortile per Azioni, Orbassano (Turin) (IT)

( * ) Notice: Subject to any disclaimer, the term of this patent is extended or adjusted under 35 U.S.C. 154(b) by 54 days.

(21) Appl. No.: 11/673,882

(22) Filed: Feb. 12, 2007

(65) Prior Publication Data

US 2007/0187952 A1  Aug. 16, 2007

(30) Foreign Application Priority Data

Feb. 15, 2006  (EP) .................................. 06425090

(51) Int. Cl.
*B62M 23/02* (2006.01)
(52) U.S. Cl. ...................................... 290/1 R
(58) Field of Classification Search ............. 290/1, 290/1 R
See application file for complete search history.

(56) References Cited

U.S. PATENT DOCUMENTS

| 4,346,777 A * | 8/1982 | Restelli ...................... 180/220 |
| 4,516,647 A * | 5/1985 | Novak ......................... 180/2.2 |
| 4,871,042 A | 10/1989 | Hsu et al. |
| 5,015,918 A * | 5/1991 | Copeland ..................... 315/76 |
| 5,079,461 A * | 1/1992 | Schluter et al. ........... 310/67 A |
| 5,121,305 A * | 6/1992 | Deed et al. ................... 362/473 |
| 5,272,938 A * | 12/1993 | Hsu et al. ................... 74/594.1 |
| 5,316,101 A | 5/1994 | Gannon |
| 5,450,915 A * | 9/1995 | Li ............................. 180/65.5 |
| 5,977,684 A * | 11/1999 | Lin ............................ 310/268 |
| 6,064,121 A * | 5/2000 | Shervington et al. ........ 290/1 A |
| 6,270,103 B1 | 8/2001 | Grimm |
| 6,486,582 B1 * | 11/2002 | Patarchi ...................... 310/166 |
| 6,982,132 B1 | 1/2006 | Golner et al. |
| 2004/0104637 A1 * | 6/2004 | Dube et al. ................. 310/177 |

FOREIGN PATENT DOCUMENTS

| AT | 402 281 B | 8/1996 |
| DE | 201 18 397 U1 | 4/2002 |
| DE | 20315750 U1 * | 2/2004 |
| EP | 1820727 A1 * | 8/2007 |
| JP | 02306888 A * | 12/1990 |
| JP | 07172372 | 7/1995 |
| JP | 2000301903 A * | 10/2000 |
| WO | WO 99/54194 | 10/1999 |
| WO | WO 03051660 | 6/2003 |

* cited by examiner

*Primary Examiner*—Joseph Waks
(74) *Attorney, Agent, or Firm*—Sughrue Mion, PLLC

(57) ABSTRACT

The wheel device including a shaft, a reversible rotary electrical machine mounted coaxially about the shaft, an energy storage device coupled to the electrical machine, an electronic control unit for controlling the electrical machine and the energy storage device according to predetermined methods, and solar energy converters connected to at least one lateral portion of the wheel to convert the incident solar energy into electrical energy, and connectable to the energy storage device.

18 Claims, 6 Drawing Sheets

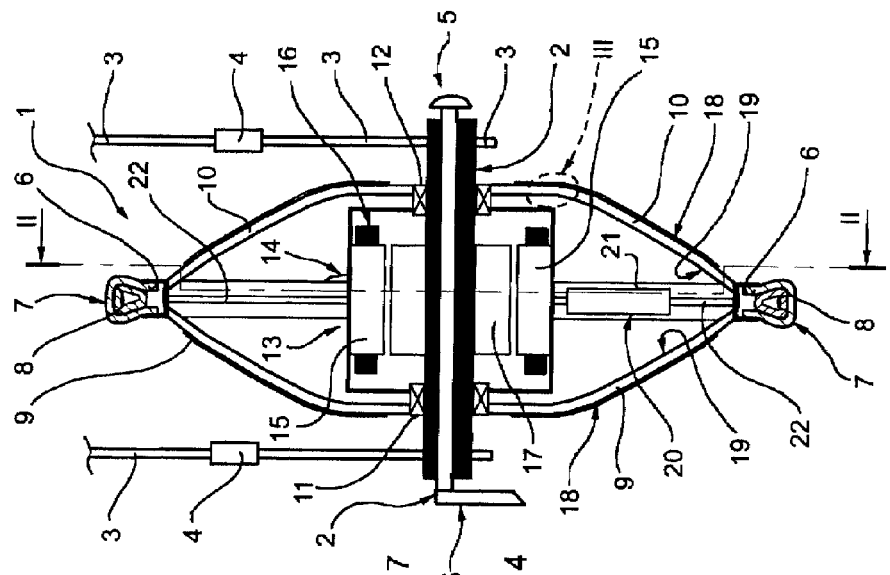
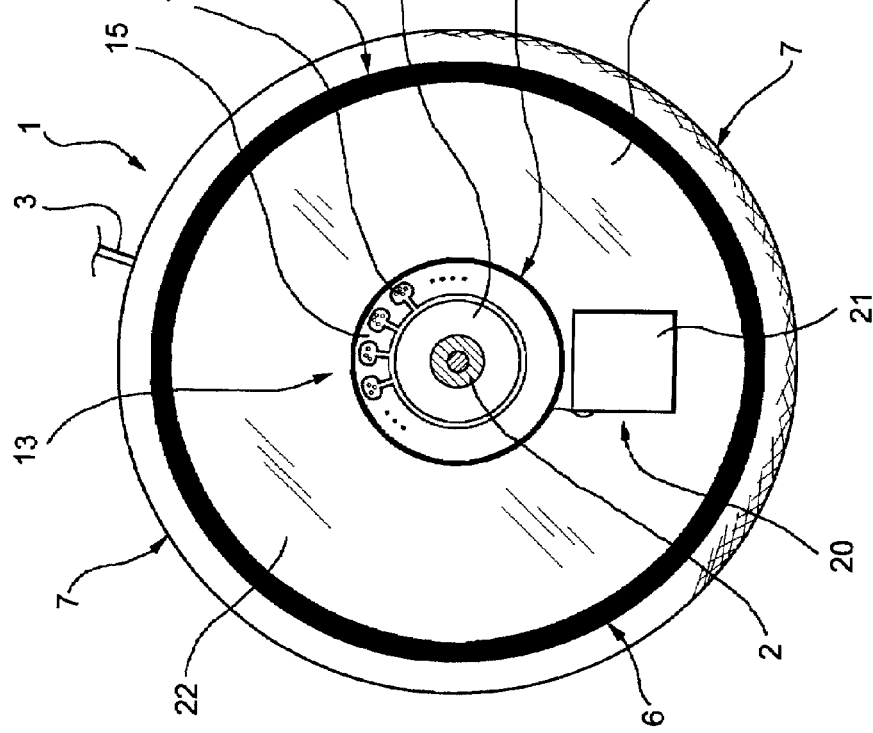

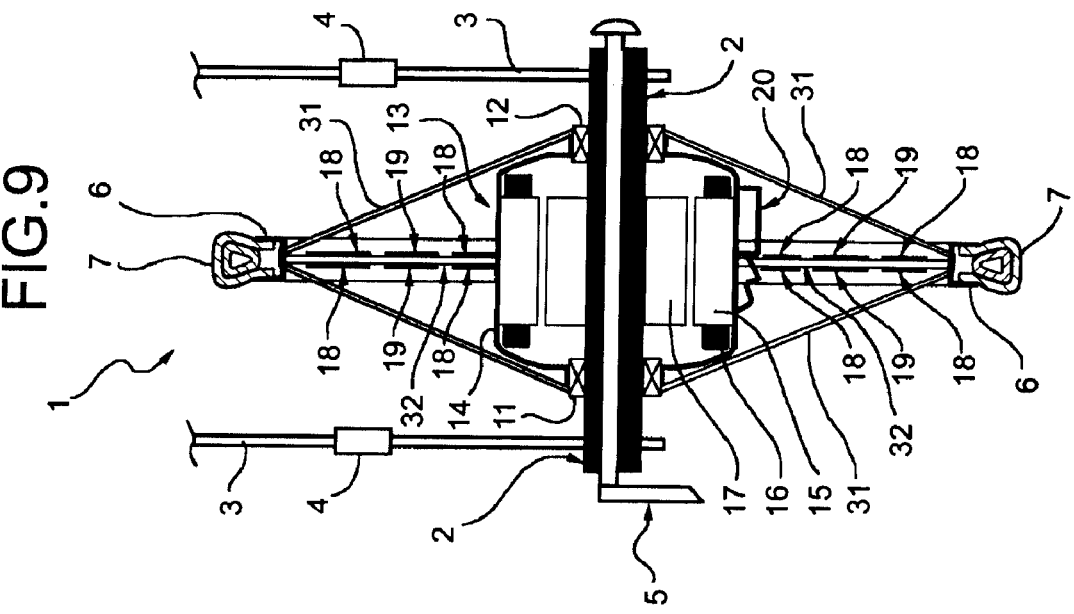
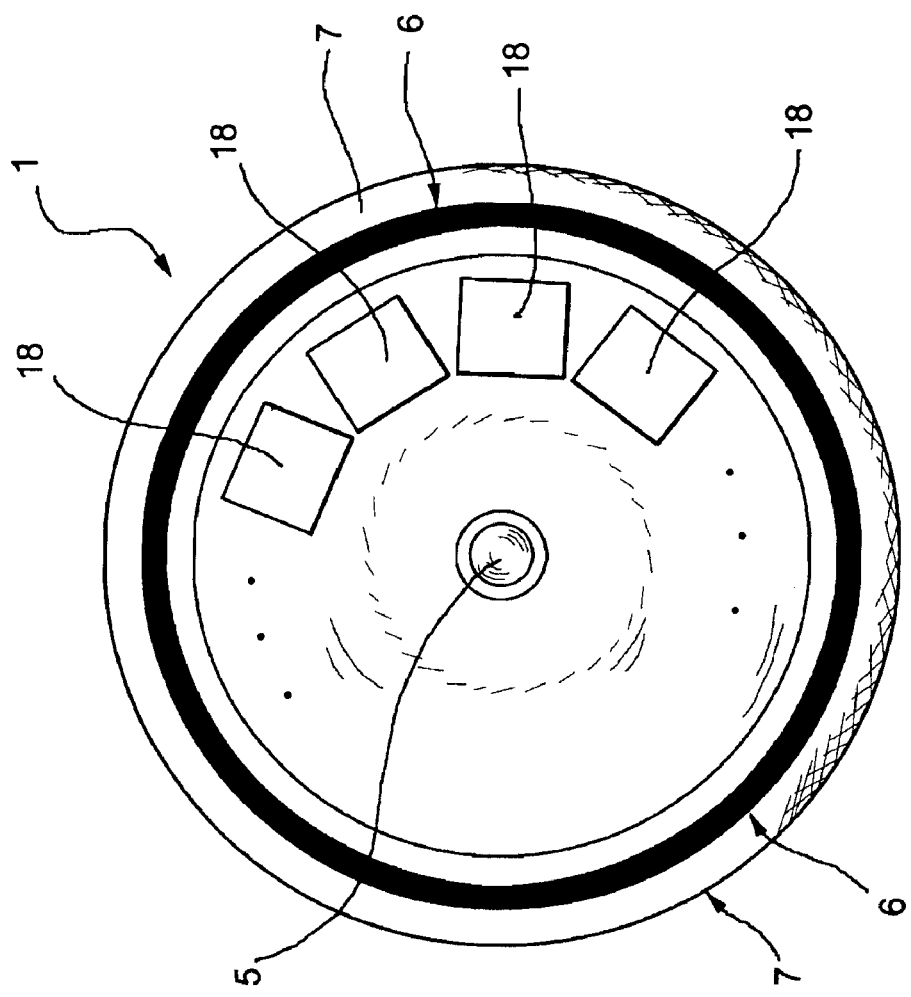

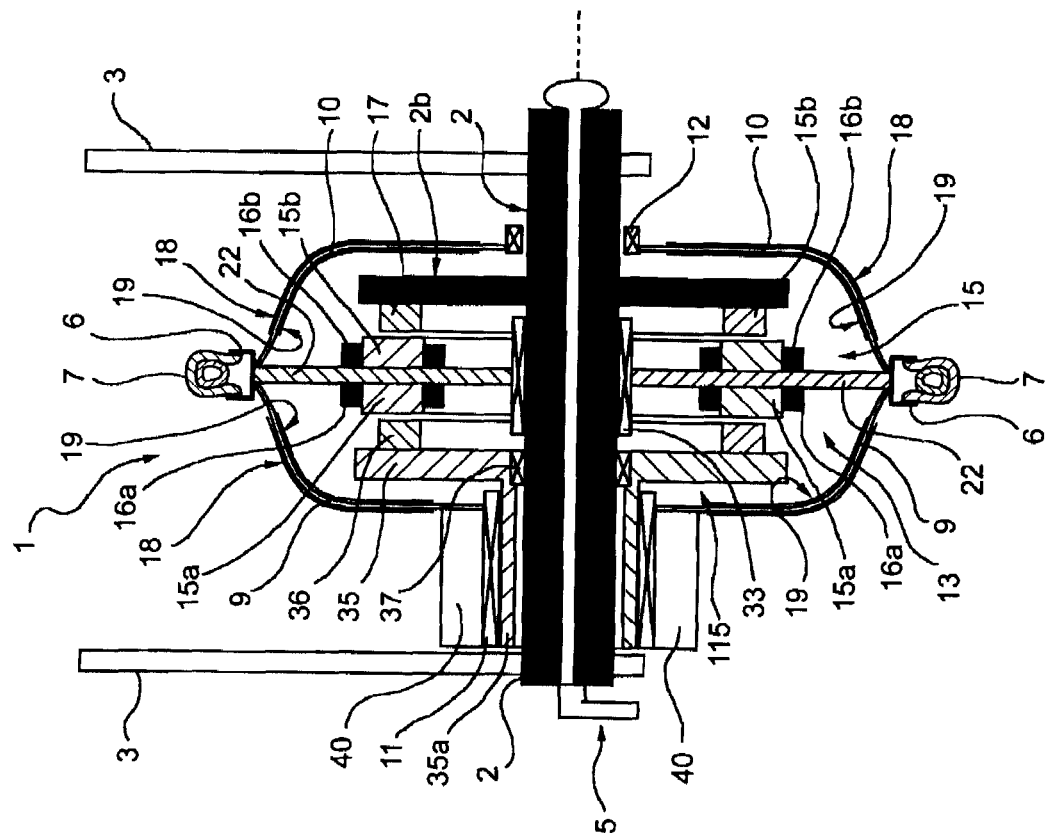
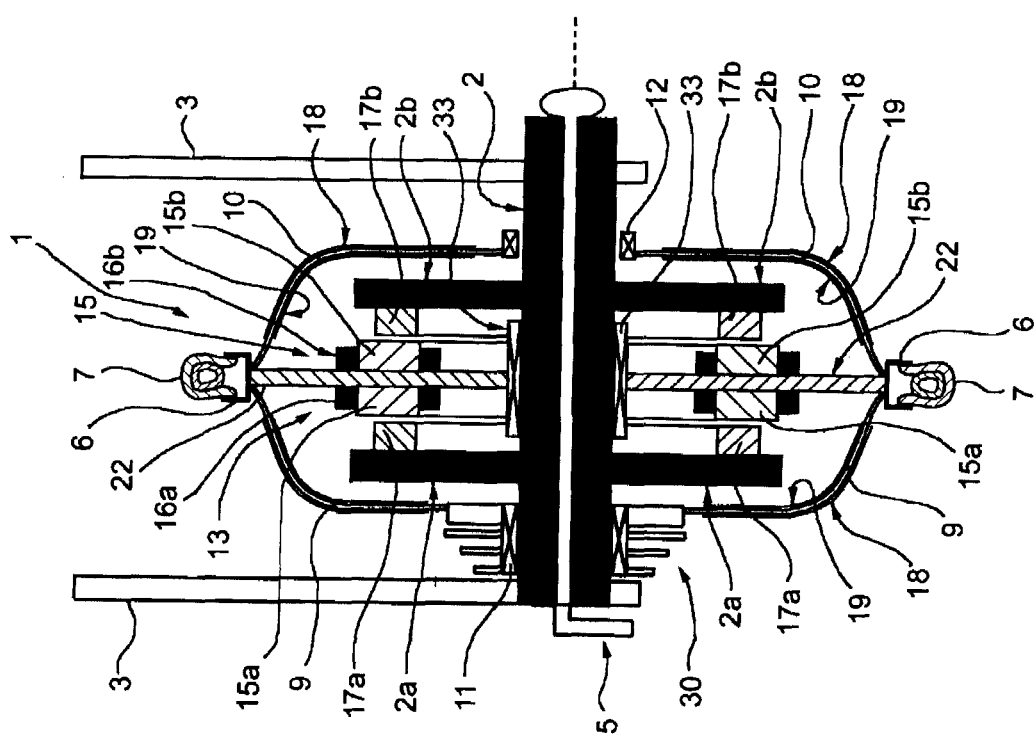

VEHICLE WHEEL

The present invention relates to a vehicle wheel.

A wheel of this type for a vehicle, in particular for a bicycle, is known from U.S. Pat. No. 6,270,103. This document discloses, inter alia, a bicycle provided with front and rear disk-shaped wheels whose hubs contain an electrical machine adapted to selectively operate as a motor or as a generator. The outer surfaces of the wheels carry photovoltaic cells and a plurality of rechargeable batteries.

German Utility Model DE 201 18 397 U discloses and illustrates a wheel in which panels of solar cells are mounted to convert solar energy into electrical energy which may be supplied to an electric hub motor under the control of an electronic unit integrated in the wheel hub.

U.S. Pat. No. 5,316,101 discloses a bicycle in which solar panels are applied to the lateral surfaces of the front wheel in order to recharge banks of batteries secured to the frame and/or to supply an electrical motor which is also secured to the frame and which is friction-coupled to the tyre of the rear wheel.

Further electrical bicycles are disclosed, for instance, in WO 2005/039917 A1 and U.S. Pat. No. 4,871,042.

An object of the present invention is to provide a wheel of the type specified above, which enables more advanced integration of the components needed to carry out electrical traction and recover kinetic energy and which also enables a drastic simplification of the structure and therefore of the operations for the assembly of the vehicle for which it is intended.

These and other objects are achieved according to the present invention by a wheel having the features defined in claim 1.

In a wheel according to the invention the at least one rechargeable battery may be a Ni—Cd battery, or a Ni-MH, Li-ion or Li—Pol battery.

Rechargeable batteries in the form of thin film are disclosed, for instance, in document U.S. Pat. No. 6,982,132.

As an alternative, the at least one battery may comprise a planar supercapacitor.

Further characteristic features and advantages of the invention are set out in the following detailed description, given purely by way of non-limiting example, and made with reference to the accompanying drawings, in which:

FIG. 1 is a sectional view of a wheel according to the present invention;

FIG. 2 is a sectional view along the line II-II of FIG. 1;

FIG. 8 is a lateral view of a further variant of a wheel according to the invention; and FIGS. 9 to 11 are sectional views of further variants of wheels according to the invention.

Figure 4:
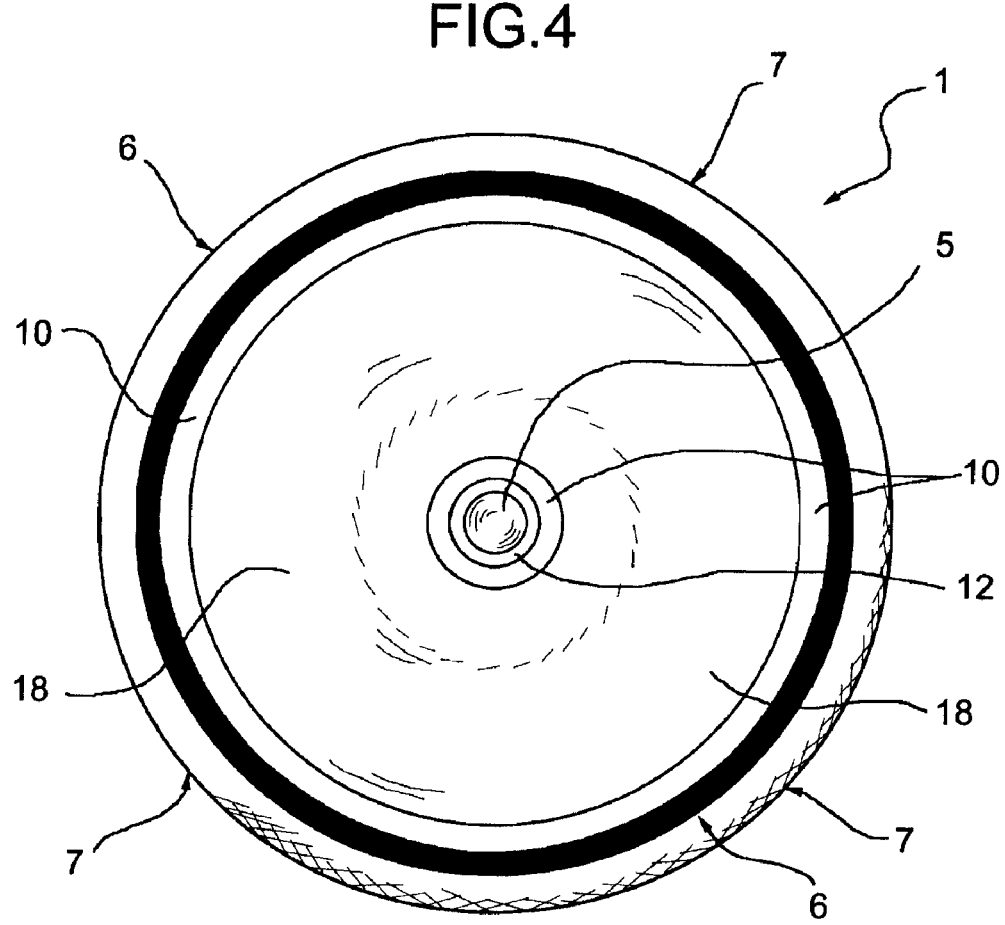
FIG. 4 is a lateral view of the wheel of FIGS. 1 and 2.

In the drawings, and in particular in FIGS. 1, 2 and 4, a vehicle wheel according to the present invention, in particular for a bicycle, is shown overall by 1. The wheel 1 of FIGS. 1, 2 and 4 is in particular adapted to be used as the front wheel of a bicycle.

In a known manner, this wheel 1 comprises a shaft 2, which is stationary in operation, adapted to be secured to a bearing structure of a vehicle, for instance to the arms 3 of a front fork of a bicycle (FIG. 1) possibly provided with damping means 4. The shaft 2 is connected to the arms or branches 3 of the fork by means, for instance, of a known rapid fastening device 5.

The wheel 1 comprises a rim 6, for instance of light metal alloy, with which a tyre 7, possibly provided internally with an air chamber 8, is associated in a known manner.

In the embodiment shown in FIGS. 1 to 4, the wheel 1 is of the type with a so-called lenticular shape and comprises a pair of opposing lateral half-shells 9 and 10 whose peripheral portions are connected to the rim 6 and whose central portions extend about the shaft 2 with the interposition of respective rotational supports 11 and 12 such as ball bearings or the like.

In the region comprised between the two half-shells 9 and 10, the wheel 1 comprises a reversible rotary electrical machine shown overall by 13. This machine is mounted coaxially about the shaft 2 and is adapted selectively to act as an electrical generator or as an electric motor actuating the wheel 1 to rotate about the shaft 2.

In the embodiment shown diagrammatically by way of example, the electrical machine 13 comprises a casing or carcase 14, substantially of cylindrical shape, mounted to rotate about the shaft 2 and is, for instance, connected to the rotational supports 11 and 12.

A rotary armature 15 provided with windings 16 is secured inside the carcase 14. This armature is substantially annular in shape and extends about a static inductor 17, also of annular shape, secured about the shaft 2. This stationary inductor is produced for instance using permanent magnets.

Figure 3:
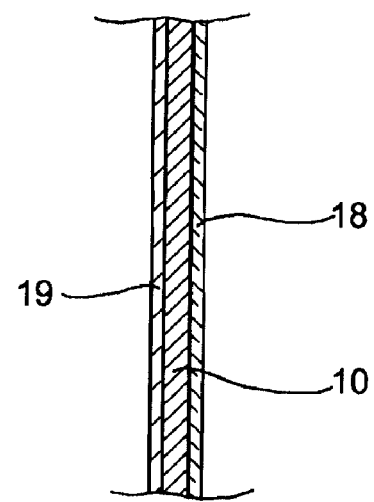
FIG. 3 is a view in transverse section of a stratified structure comprising a solar panel and a planar or film battery for use in a wheel according to the present invention.

The wheel 1 is associated with means adapted to convert the solar energy incident on the outer surface of the wheel 1 into electrical energy. These converter means may be selected from among the various known types, for instance monocrystalline-silicon, multicrystalline-silicon, string ribbon, thin film, amorphous silicon, cadmium telluride or copper-indium diselenide converters, or converters with an electrochemical junction of dye-sensitised type (Graetzel cell) or polymer or photosynthetic converters. In the embodiment shown in FIGS. 1 to 4, these photovoltaic conversion means comprise thin photovoltaic panels applied to the outer lateral surfaces of the half-shells 9 and 10. In FIGS. 3 and 4, such a photovoltaic panel of annular shape 18 is applied to the outer surface or face of the half-shell 10 about the central portion of the latter surrounding the stationary shaft 2. A similar annular panel is advantageously applied to the outer surface or face of the half-shell 9.

The electrical machine 13 is also associated with electrical energy storage means, advantageously in the form of one or a plurality of planar or thin film batteries 19 applied to at least one lateral portion of the wheel 1 and rotating rigidly therewith. In the embodiment shown in FIGS. 1 to 4, respective planar or film batteries 19, of substantially annular shape, are applied to the inner surfaces of the half-shells 9 and 10.

In embodiments which are not shown, the planar or film battery or batteries may be applied between the half-shells and the associated photovoltaic panels 18.

In further embodiments which are not shown, planar or film batteries and thin photovoltaic panels may be applied to various portions of the same outer surface or face of the wheel.

In addition to the solar panels 18 and the planar or film battery or batteries 19, the electrical machine 13 is also associated with an electronic drive and control unit 20 mounted inside the wheel. In the embodiment shown in FIGS. 1 and 2, the components of the electronic drive and control unit 20 are housed in a housing 21 connected to an inner baffle or diaphragm 22 of the wheel.

In embodiments which are not shown, the drive and control unit 20 may be physically disposed in locations other than that shown in FIGS. 1 and 2. This unit may, for instance, be mounted inside and rigidly with the housing 14 of the electrical machine 13. In further variants which are not shown, the unit 20 may be mounted rigidly with the stationary shaft 2.

Figure 5:
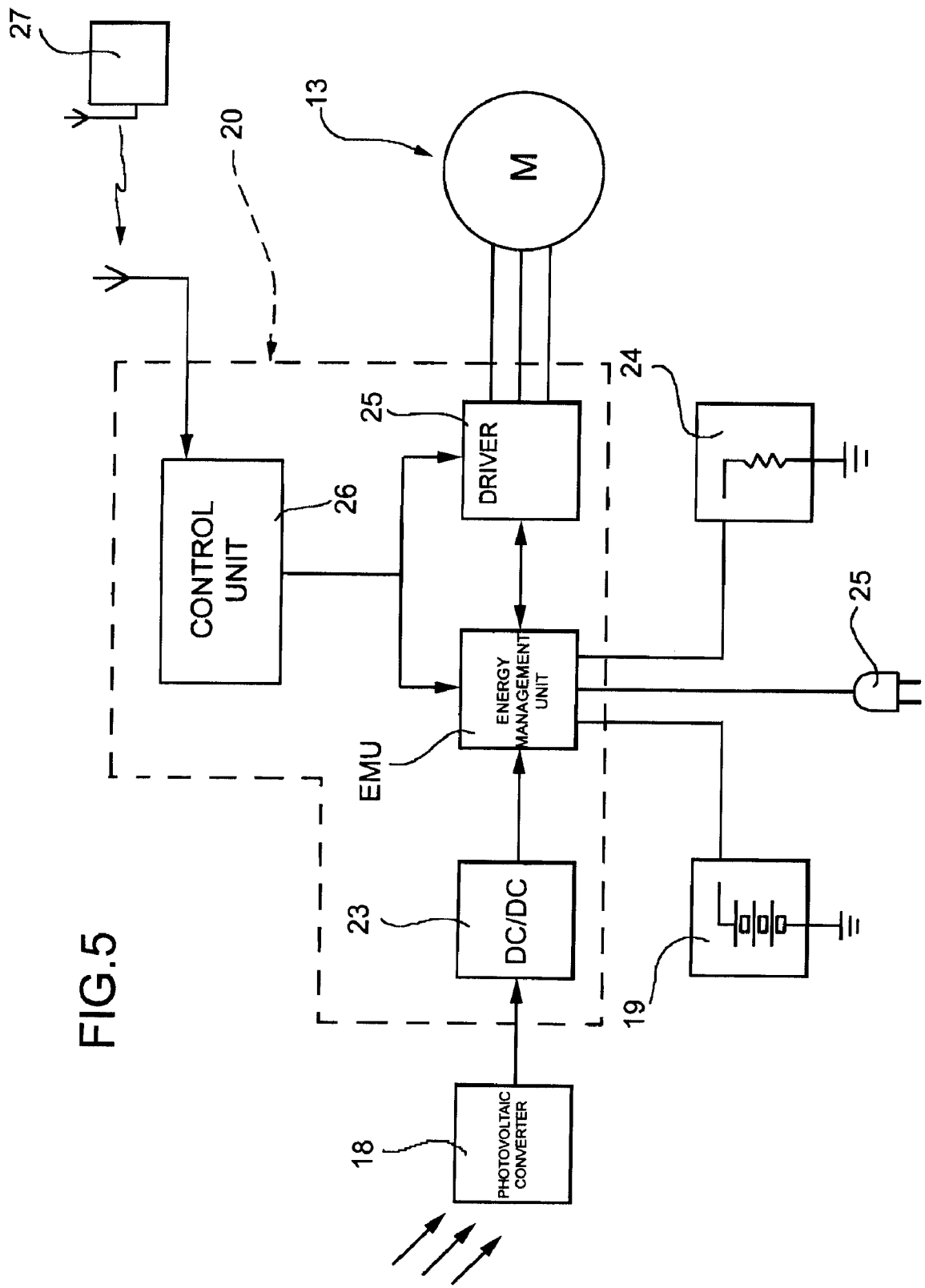
FIG. 5 is a block diagram showing an interconnection architecture of the electrical/electronic components for a wheel of the invention.

In a preferred embodiment shown diagrammatically in FIG. 5, the drive and control unit 20 comprises a dc/dc converter 23 interposed between the output of the photovoltaic converter(s) 18 and the input of an energy management unit EMU.

The planar or film battery or batteries 19, an energy dissipation device 24, for instance comprising a resistor, and a driver circuit 25 associated with the electrical machine 13 are also connected to the unit EMU.

The unit EMU and the driver 25 are managed in turn by an electronic control unit 26. In use, control signals transmitted by a control device 27, for instance mounted on the handlebars, which may be actuated by the vehicle user to request and control a traction or braking action by means of the machine 13, may be supplied to the control unit.

Advantageously, the control device 27 may be coupled to the control unit 26 in a wireless manner, for instance by radio or by magnetic induction. This solution makes it possible to avoid any need for cabling between the control device and the wheel of the invention. The wheel may therefore be simply interchanged with a conventional bicycle wheel and, for its use, the control device 27 merely needs to be attached to the handlebars or another part of the bearing frame of the bicycle. This device 27 could simply be worn by the user.

The control device 27 may in particular be adapted to allow the control of the electromagnetic braking of the wheel in a mode in which the electrical machine 13 acts as an electrical generator with braking action. Similarly, the control device 27 may be adapted to enable the supply intensity of the energy storage system to be regulated.

No further operation is needed to make the wheel of the invention operational.

The energy management unit EMU is advantageously adapted to allow a flow of electrical energy from the dc/dc converter to the battery or batteries 19 and/or to the driver 25 when the electrical machine 13 is to function as a motor. In the latter case, the energy management unit EMU may also be adapted to allow a flow of electrical energy from the battery or batteries 19 to the driver 25 to enable the machine 13 functioning as a motor to be appropriately supplied.

When the electrical machine 13 is functioning as an electrical generator, the unit EMU enables a flow of electrical energy from the driver 25 to the battery or batteries 19 and possibly to the dissipation device 24 when the battery or batteries 19 are already fully charged.

The drive and control unit 20 may also be provided with an electrical connection device, such as a socket 28 (FIG. 5), to enable electrical energy to be drawn from the battery or batteries 19 to supply devices external to the wheel 1, for instance lights, etc.

This connection device, or a further separate device (not shown), may possibly be used to recharge the battery or batteries 19 with electrical energy from a source external to the wheel 1.

Figure 7:
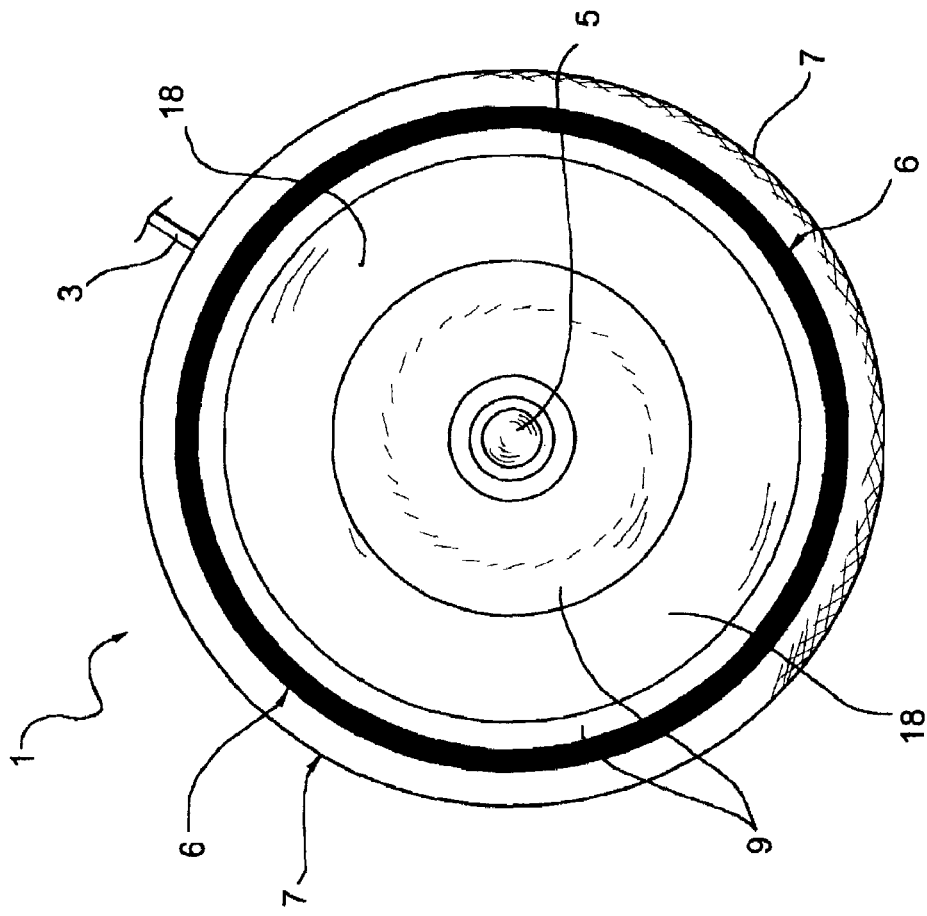
FIG. 7 is a lateral view of a variant of the wheel according to the invention.
Figure 6:
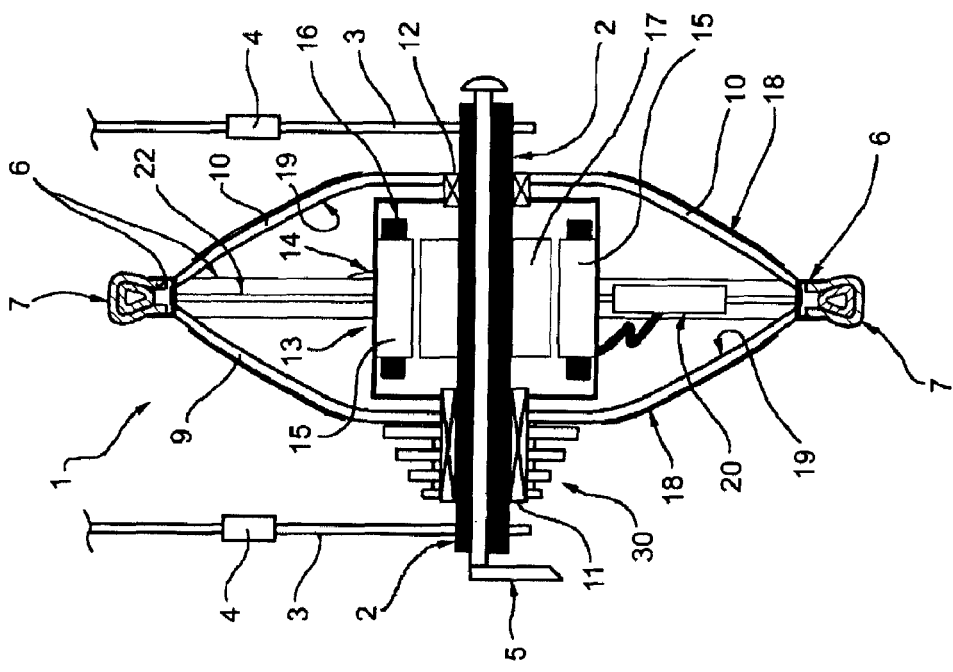
FIG. 6 is a view similar to that of FIG. 1 showing a variant of the wheel according to the invention.

FIGS. 6 and 7 show a further wheel of the present invention. In these Figures, parts and components already described bear the reference numerals previously used.

The wheel of FIGS. 6 and 7 is a rear bicycle wheel. In the embodiment shown, the half-shell 9 is connected to a pack 30 of sprockets or toothed wheels, of different diameters, which cooperate in a known manner with a chain (not shown) and an associated derailer device (also not shown) and make it possible to apply a plurality of different discrete transmission ratios. The pack of sprockets 30 is mounted to rotate within the stationary shaft 2 with the interposition of an appropriate rotational support 11.

In the embodiment of FIGS. 6 and 7, the solar panel 18 applied to the outer surface of the half-shell 9 has an annular shape and an inner diameter at least slightly greater than the diameter of the largest of the sprockets of the pack 30.

In other respects, the wheel of FIGS. 6 and 7 corresponds substantially to the wheel described above with reference to FIGS. 1 to 4.

Other known gear change devices may nevertheless be associated with the wheel of the invention.

FIG. 8 shows a variant of a wheel of the invention, in which a plurality of individual photovoltaic solar panels 18 of standard type and format, readily available commercially, are applied to the lateral surfaces or faces of the wheel. These panels are interconnected with one another and with the drive and control unit 20 in a manner which is not shown.

FIG. 9 shows a further variant of a wheel of the invention. In this Figure as well, parts and components already described again bear the reference numerals previously used.

The wheel of FIG. 9 is not of the type with a lenticular shape, but of the type in which a plurality of spokes 31 extends between the hub and the rim.

These spokes, according to a conventional arrangement, are divided into two opposite lateral groups and the electrical machine 13 and the associated drive and control unit 20 are housed in the region comprised between these two groups of spokes.

In the embodiment of FIG. 9, photovoltaic solar panels 18 and associated planar or film batteries 19 are advantageously secured to an intermediate structure 32, for instance a disc or a plurality of spokes or the like, which extends between the electrical machine 13 and the rim 6.

In alternative embodiments which are not shown, the solar panel(s) 18 and the associated planar or film batteries 19 may be secured directly to the spokes 31.

FIG. 10 shows a further variant. In this Figure, parts and components already described bear the reference numerals previously used.

The particular variant shown in FIG. 10 relates to a rear bicycle wheel, but it will be appreciated by persons skilled in the art that such a wheel could also be a front wheel.

The variant of FIG. 10 differs from the preceding variants largely in terms of the different configuration of the reversible electrical machine 13. In this embodiment, the machine 13 comprises a rotor 15 supported by an annular disc 32 rigid with the rim 6 and supported in a rotary manner about the stationary shaft 2 by means of a support 33. In the embodiment shown, the rotor 15 comprises two rings 15*a* and 15*b* applied to the two main surfaces of the disc 22 and provided with respective rotor windings 16*a* and 16*b*.

The rotor rings 15*a*, 15*b* are faced at the front by corresponding permanent-magnet stator rings 17*a*, 17*b* secured to corresponding radial flanges 2*a*, 2*b* of the stationary shaft 2.

While in the embodiments described above the inductor or stator generates a primarily radial magnetic flux about the axis of the shaft 2 and radially faces the armature or rotor via a substantially cylindrical air gap, in the embodiment of FIG. 10, the inductors 17*a*, 17*b* generate a primarily axial flow in operation, parallel to the axis of the shaft 2, and are faced at the front by the associated armatures 15a, 16a and 15b, 16b via air gaps substantially in the form of a thin circular crown.

In other variants which are not shown, the inductor and the armature of the electrical machine 13 may be made from special materials (composite magnetic materials) adapted to enable the production of magnetic circuits in which the magnetic flux does not have a primary direction but is rather directed in different directions in the various sections of the magnetic circuit.

FIG. 11 shows a further variant of a wheel of the invention for use as a rear bicycle wheel. In this variant as well, parts and components already described again bear the reference numerals previously used.

The variant of FIG. 11 internally comprises a reversible electrical machine of special type adapted to form a transmission ratio system continuously variable in a predetermined range of values. Electrical machines of this type are known, for instance from International Patent Application WO 03/051660 in the name of the same applicant.

The wheel 1 illustrated in FIG. 11 comprises a rim 6 on which two half-shells 9 and 10 are secured and provided, as described above, with outer photovoltaic solar panels 18 and inner planar or film batteries 19.

In the embodiment shown, the electrical machine 13 comprises a primary rotor 15 structurally similar to that of FIG. 10 and which is not therefore described in further detail.

The primary rotor 15 faces on one side (the right-hand side when looking at FIG. 11) a permanent-magnet stator 17 supported by an annular flange 2b of the stationary shaft 2.

On the opposite side, the primary rotor 15 faces a secondary rotor shown overall by 115. This rotor comprises an annular disc 35 carrying a ring 36 with permanent magnets facing the ring 15a of the primary rotor 15.

The ring 35 is mounted to rotate about the stationary shaft 2 with the interposition of a support 37.

On the opposite side to the stator 17, a tubular projection 35a extends from the disc 35 of the secondary rotor 115, about which projection, externally to the wheel 1, a toothed wheel 40, rigid with the shell 9 and therefore with the rim 6 of the wheel 1, is mounted to rotate. A bearing support 11, which also acts as a support between the shell 9 and the tubular projection, is interposed between the toothed wheel 40 and the tubular projection 35a of the secondary rotor 115.

The special electrical machine 13 of the wheel 1 of FIG. 11 is associated with an electronic control unit (not shown) which is adapted to control this electrical machine so as to provide a continuously variable transmission ratio as a function of control signals supplied to this control unit, for instance by means of a remote control device such as the device 27 of FIG. 5.

In other respects, the wheel 1 of FIG. 11 operates in a similar way to the wheels of the invention described with reference to the preceding Figures.

It will be appreciated that, without prejudice to the principle of the invention, its embodiments and details may be widely varied with respect to what has been described and illustrated purely by way of non-limiting example, without thereby departing from the scope of protection of the invention as set out in the accompanying claims.

What is claimed is:

1. A vehicle wheel device, comprising:
   a wheel;
   a shaft adapted to be secured to a bearing structure of the vehicle and about which the wheel is mounted to rotate,
   a reversible rotary electrical machine mounted coaxially about the shaft and adapted selectively to act as an electrical generator and an electric motor actuating the wheel,
   energy storage means adapted to be coupled to the electrical machine and comprising at least one rechargeable substantially planar or film battery applied to at least one lateral portion of the wheel and rotating rigidly with the wheel;
   photovoltaic converter means connected to at least one lateral portion of the wheel and adapted to convert the incident solar energy into electrical energy, and which are adapted to be coupled to the energy storage means; and
   electronic control means adapted to control the electrical machine and the energy storage means according to predetermined methods, the photovoltaic converter means and at least the one planar or film battery being applied to opposing surfaces associated with the wheel,
   wherein the electrical machine comprises an armature or primary rotor rotationally rigid with the wheel, and a secondary rotor, these rotors rotating with respect to the shaft, the electrical machine further comprising a stator or inductor rigid with the shaft, wherein the electrical machine can be driven so as to provide a continuously variable transmission ratio between a source of torque coupled to the wheel and the wheel.

2. The wheel device as claimed in claim 1, wherein the wheel is of lenticular shape and comprises a pair of opposite lateral half-shells, and in which the photovoltaic converter means comprise at least one solar panel applied to a surface of at least one of the half-shells.

3. The wheel device as claimed in claim 2, wherein the photovoltaic converter means are applied to an inner surface of at least this one half-shell.

4. The wheel device as claimed in claim 2, wherein at least the one solar panel is of substantially annular shape and is applied to a half-shell in a substantially concentric arrangement with the shaft.

5. The wheel device as claimed in claim 2, comprising a plurality of photovoltaic solar panels applied to a half-shell in a substantially concentric arrangement with the shaft.

6. The wheel device as claimed in claim 2, wherein at least the one planar or film battery is applied to the outer or inner surface of at least one of the half-shells.

7. The wheel device as claimed in claim 2, wherein the electrical machine is mounted within a region comprised between the half-shells.

8. The wheel device as claimed in claim 1, comprising a plurality of spokes and in which the solar energy converter means and at least the one planar or film battery are connected to these spokes.

9. The wheel device as claimed in claim 8, wherein the electrical machine is mounted within a region comprised between a first and a second lateral group of spokes.

10. The wheel device as claimed in claim 1, wherein the electrical machine comprises
    a static inductor rigid with the shaft, and
    a rotary armature mounted to rotate with respect to the inductor about the axis of the shaft and rigid with the energy storage means.

11. The wheel device as claimed in claim 10, wherein the inductor is adapted to generate a radial magnetic flux about the axis of the shaft and radially faces the armature via a substantially cylindrical air gap.

12. The wheel device as claimed in claim 10, wherein the inductor is adapted to generate an axial magnetic flux, parallel to the axis of the shaft, and at the front faces the armature via an air gap substantially in the form of a circular crown.

13. The wheel device as claimed in claim 12, wherein the inductor comprises a first and a second annular stator coaxial and rigid with the shaft and spaced from one another parallel to the axis of the shaft and wherein the armature comprises an annular disc disposed between the first and the second stator and provided with a first and a second armature winding cooperating in operation with the first and the second stator respectively.

14. The wheel device as claimed in claim 10, wherein the electrical machine is mounted within a region comprised between the half-shells.

15. The wheel device as claimed in claim 10, wherein the electrical machine is mounted within a region comprised between a first and a second lateral group of spokes.

16. The wheel device as claimed in claim 1, wherein the solar energy converter means are selected from among monocrystalline-silicon, multicrystalline-silicon, string ribbon, thin film, amorphous silicon, cadmium telluride or copper-indium diselenide converters, or converters with an electrochemical junction of dye-sensitised type (Graetzel cell) or polymer photovoltaic converters and photosynthetic photovoltaic converters.

17. The wheel device as claimed in claim 1, wherein the electrical energy storage means are selected from among Ni—Cd, Ni-MH, Li-ion and Li-Pol batteries.

18. The wheel device as claimed in claim 1, wherein the electrical energy storage means comprise at least one supercapacitor.

* * * * *